July 6, 1965 R. M. SANDERS 3,193,808

DIGITAL SHIFT CIRCUIT

Filed Oct. 13, 1960

United States Patent Office 3,193,808
Patented July 6, 1965

3,193,808

DIGITAL SHIFT CIRCUIT

Richard M. Sanders, St. Paul, Minn., assignor to Sperry Rand Corporation, New York, N.Y., a corporation of Delaware Filed Oct. 13, 1960, Ser. No. 62,440
3 Claims. (Cl. 340—174)

This invention relates to circuits for parallel shifting a plurality of digital signals to change their positions in a digital register and for detecting the scaling of numbers indicated by signals in the register.

Many shift circuits shift all digital signals to the right or left a single digit position at a time, or at best shift such signals a plurality of digit positions at one time which shift is less than the maximum desired shift. This invention provides a shift circuit which completes a shift or any cyclic permutation of digital signals in a time independent of the number of digit positions shifted and of the number of signals shifted. It further provides a means of determining the digit position within the register containing the most significant digit, that is, the leading 1 of positive number or the leading 0 of a negative number, as required in what is termed a scale factor operation.

It is an object of this invention to provide a shift circuit for shifting all digital signals in a single register with a single electrical impulse.

It is another object to provide a rectangular array of two-state devices which effectuates a digital signal shift with one electrical actuating impulse.

It is a further object to provide scale factor detecting means in a two-state element rectangular shift array.

It is still another object to provide a rectangular array of two-state ferromagnetic devices which includes windings disposed to effectuate a digital signal shift with one electrical impulse.

The various objects and advantages of this invention are accomplished by the following illustrated embodiment in which a rectangular array of magnetic cores has a plurality of digital-signal input lines each inductively coupled to every core in the respective array column. An electromagnetic impulse representing binary information is transmitted through each input line to all the cores inductively coupled to that line. Each of a plurality of shift lines is inductively coupled to all cores in the respective row. A single electromagnetic impulse is transmitted through one of the shift lines to all cores inductively coupled to that line. Each of a plurality of sense or output lines is inductively coupled to all cores in the respective array diagonal, all parallel sense lines being for transferring signals shifted (subjected to a cyclic permutation) in one of two directions, i.e. right or left.

Proper scaling of binary signals is detected by connecting a difference detector, such as an exclusive OR or half-added circuit, between the sense line on a major (corner-to-corner) array diagonal and the adjacent sense line to the right of the major diagonal.

These and other more detailed and specific objects will be disclosed in the course of the following specification, reference being had to the accompanying drawings, in which—

Figures 1, 2, 3:
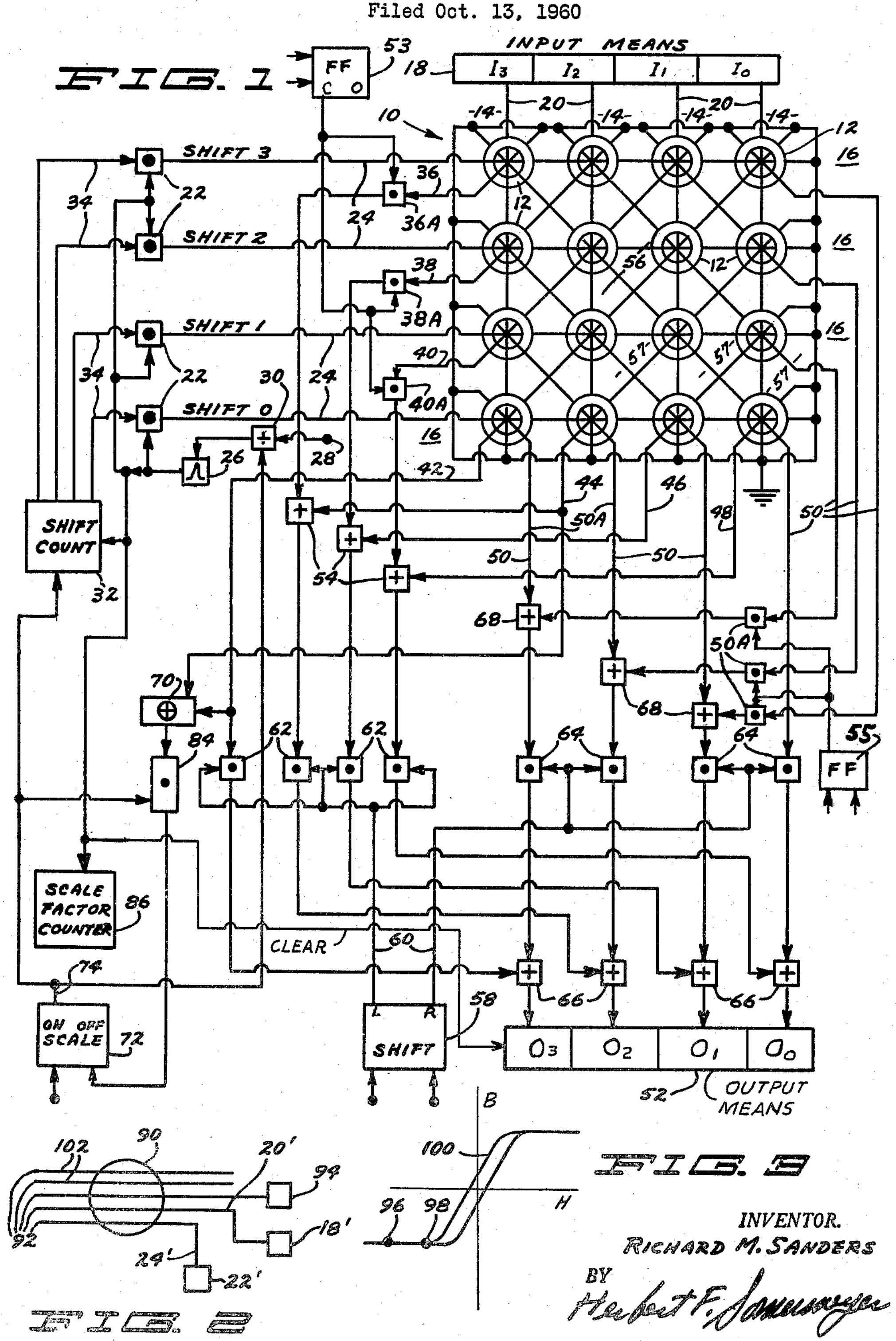
FIG. 1 is a schematic diagram of the illustrated embodiment of this invention.
FIG. 2 is a schematic diagram of a ferromagnetic film element for use with the present invention, showing the bias and electrical pulse sources for use therewith.
FIG. 3 is an exemplary hard-magnetization-axis hysteresis characteristic found in the FIG. 2 element core, which exhibits uniaxial anisotropy.

As shown in FIG. 1 the shift circuit includes a square array 10 of two-state elements consisting of saturable magnetic cores 12 each of which preferably has a rectangular hysteresis characteristic. By way of example, ferrite toroidal cores are illustrated. For a digital word length (one set of signals) of N digital signals, an array of N columns 14 with N rows 16 of elements is provided. For brevity only in this description, the digital word length is limited to four digits.

Each of the input means 18, which constitutes an ordered set of N cells in this embodiment, includes a current source (not shown) connected to the respective digital signal input lines or windings 20 each of which is magnetically coupled to every core in the respective column 14. When a particular cell contains a binary one signal, a current is provided thereby through the corresponding line 20 to magnetically switch all cores in that column to what is termed a binary one magnetic remanent state. When an input cell contains a binary zero signal, reversely flowing current is provided to magnetically switch the respective column cores to the opposite magnetic state which is termed a zero magnetic remanent state.

Alternatively, all the cores in the array 10 may be first switched into the so-called zero magnetic state by a reversely flowing current through all input lines 20. Then a current is provided through the lines 20 corresponding to cells containing a binary one signal for magnetically switching all cores in the respective columns into the same respective magnetic state. In any event, the array 10 elements 12 in the respective columns are switched into one of two binary magnetic states for indicating respectively the signals to be shifted.

After the input signals from the means 18 have been inserted into the array 10 columns as described above, an enabling electrical signal is applied to the terminal 28 for causing the single pulse generator 26 to emit a single electrical impulse to the output means 52 and to all of the AND circuits 22 for effectively clearing the output means and shifting the input signals, as will now be described. The AND circuits 22 are selectively opened by a signal on only one of the respective lines 34 from the shift count control 32. The count control 32, which may consist of a ring counter, provides signals such that one and only one of the AND circuits 22 is enabled to pass the generator 26 current impulse. The circuits 22 each preferably include pulse amplification and time delay means. The delay is desirable to permit the output means 52 to be cleared before the shifted signals are inserted therein.

For a shift of a predetermined number of digit positions, the shift line 24 designated to complete that shift, i.e. shift 0, shift 1, shift 2 or shift 3 places, transfers a single electromagnetic impulse to all the cores in the respective row 16 to effect the shift operation, as will become apparent. For example, a shift of three digital positions is accomplished by a pulse flowing through the shift 3 line 24. There are no signals provided to any other row in the array 10.

The magnetic effect of the single pulse flowing through a single shift line 24 is to drive all cores in the respective array row 16 toward the binary zero magnetic state. Cores which are in the binary one magnetic state are switched to the binary zero magnetic state, which has a remanent state undergoes no further change, to provide what is termed destructive interrogation. Alternatively, the magnetic change for the binary one state cores may be a reversible one, as will be later described, to provide non-destructive interrogation. In any event, all cores in the selected row which are in a binary one magnetic state traverse a high-permeability region of their respective hysteresis characteristic to transfer a portion of the single pulse on only one of the lines 24 to later described sense or output lines. The cores in the selected row which are in the zero state transfer practically none of the pulse to said sense lines as the pulse drives such cores further into saturation. It is seen that the pulse is transferred as an image of the input signals to the respective sense lines 36, 38, 40, 42, 44, 46, 48 and 50.

The transferring of the single pulse through the array 10 for a left shift is completed by the array diagonal sense lines 36, 38, 40, 42, 44, 46 and 48; each sense line being coupled to one and only one core in any given row. A right shift is effected by the perpendicularly disposed array diagonal sense lines collectively designated by the numeral 50 and likewise each of these lines are coupled to one and only one core in any given row. Further each core 12 is coupled to one and only one left-shifting sense line 36, 38, 40, 42, 44, 44, 46 and 48 and to one and only one of the right-shifting sense lines 50. Each output or diagonal sense line is connected through suitable later described gating means to the output means 52 which has been cleared of information signals by the generator 26 pulse prior to receiving the shifted signals. In a practical embodiment the output means may include the two-state devices of the input means 18, i.e. the gates 66 may be inputs to the means 18. Both of the input and output means preferably include some form of digital register consisting of an ordered set of two-state devices to effectively store the digital signals.

As an example for a shift of zero digit positions, a current pulse is transmitted only along the shift 0 line 24 and inductively coupled through cores traversing a high-permeability region of their hysteresis characteristic to the respective output lines and thence through the gating circuits described below the respective cells of the output means 52, setting the two-state devices therein to the state representing a binary 1. No current pulse is transmitted through cores not traversing a high-permeability region, or, at most, only a small noise signal insufficient to change the state of the output register cell. Similarly for a shift of some other number of digit positions, a current pulse is transmitted along some other shift line 24, but is received by cells of the output register differing in position from the cells receiving the respective zero-shifted signals by the amount of the shift.

The control 53 opened AND gates 36A, 38A and 40A together with the OR gates 54 provide a left-hand "circular" shift between the input and output means, that is, a rearrangement of the signals from the input means to the output means such that signals shifted past the output means left-hand end, as carried by the sense lines 36, 38, and 40 on one side of the major array diagonal 56, are effectively reinserted into the output means from its right-hand end by the OR circuits 54 to effectively cause a circular signal shifting pattern.

To form a composite sense line, the OR circuits 54 combine the output signals of the sense lines spaced apart by the number of digit positions in the input means 18, i.e. the number of signals to be shifted. For example, the lines 40 and 48 are so interconnected as to provide signals to the $0_0$ position of the output means 52 for shifts of 0, 1, 2 and 3 positions respectively from the $I_0$, $I_3$, $I_2$, $I_1$ digit positions of the input means 18. Sense lines 36 and 44, 38 and 46 are similarly interconnected as shown in the drawing. Two sense lines so combined are equivalent to one sense line which is magnetically coupled to one core in each of the rows and to one core in each of the columns such as to provide all possible inputs to each digit position of the output means.

An "open-ended" left shift is one wherein the signals shifted past the left-most digit position of the output means 52 are discarded. For such a left shift the control multi-vibrator 53 is set such that the AND gates 36A, 38A and 40A are closed for blocking the signals on the lines 36, 38 and 40 to the output means 52, effectively discarding these signals. The only signals transferred to the output means 52 are on the sense lines 42, 44, 46 and 48. Note that these are the sense lines which transfer the signals in a zero shift as caused by the current pulse on the shift 0 line 24. For a comparable right-hand open-ended shift the control 55 closes the gates 50A. It may be noted that the sense lines which are used to accomplish an open-ended left shift are respectively on the array major diagonal 56 and the diagonals 57 to one side thereof including the shift zero array row 16. A similar spatial relation exists among the right-shift sense windings. The sense windings on the opposite side of the array major diagonal 56 are for effectively transferring signals past the output register extremities.

In circuits having both left-and right-shift facilities, a bistable multivibrator 58 having signal inputs designating the direction of the shift provides gate-enabling signals over the control lines 60 to the sets of four logical AND pulse coincidence gates 62 and 64. When the multivibrator is set to the state "L," indicating left, the gates 62 are opened while the gates 64 are closed thereby passing only the left-shifted signals to the output means 52 via the logical OR circuits 66. Reversing the multivibrator 58 conduction state opens the gates 64 and closes gates 62 to pass only the signals from the right-shift sense lines 50 to the means 52. Note that the various lines 50 are interconnected by the diode OR circuits 68 in the same manner as OR circuits 54 interconnect the left shift sense lines 36–48.

To adapt the shift circuit to perform scaling, i.e. shift the signals in the circuit until the two left-most digit positions have signals respectively indicating different binary values, the difference detector or exclusive OR circuit 70 is connected to the sense lines 42 and 44 and the control 58 is set to the "L" state. The detector 70 transfers an output signal only when the input signals are different, as shown in the following truth table wherein "1" indicates a binary one signal.

*Table I*

| Line 42 | Line 44 | Output |
|---|---|---|
| 0 | 0 | 0 |
| 0 | 1 | 1 |
| 1 | 0 | 1 |
| 1 | 1 | 0 |

Such detector circuits are believed to be sufficiently well known to warrant no further discussion herein.

The input signals to be scaled are inserted into the means 18 and thence into the array 10 as described above. A scale-control flip-flop or bistable multivibrator 72 is then set to the "on" state to provide a gate-enabling electrical signal over the line 74 to turn on the timing pulse generator 26 through the OR circuit 30 and to the shift control means 32 for initially setting the shift control 32 ring counter to a zero shift. The generator 26 then emits recurrent pulses for advancing the shift count by one each pulse, for clearing the output means 52 of prior received signals, and for sequentially driving the lines 24 beginning with the shift zero line until the detector 70 emits an output pulse which indicates that the number is scaled. Since the input digital signals are stored in each row 16 the input means need insert the signals but once even though the array receives sequenced current pulses on the lines 24 for shifts of 0, 1, 2 and 3 digit positions.

Note that the generator 26 pulse is applied to the control 32 ring counter to advance the signal therein in the usual manner for effecting a left shift count advance of one for each successive generator 26 pulse to drive the lines 24 in sequence beginning with the shift zero line as described. In addition the pulses may be used to increment the scale factor counter 86 in the usual manner for tallying the number of shifts necessary to obtain a scaled set of signals within the output register, provided the information content is not zero. The generator 26 pulses also clear the output means 52 of signals received prior to the transfer of the respective shifted signal pulses.

During scaling operations, to stop the shifting with a fully scaled set of signals, the control 72 "on" signal is applied to the pulse coincidence gate 84 together with the detector 70 output pulse resulting in a signal applied to the control 72 for switching same to the "off" state. The output means 52 then contains the properly scaled number and the scaling count is stored in the counter 86 as well as being indicated in the shift count control 32. During the scaling operation, the signals successively transferred to the output means 52 fully replace any prior transferred signals leaving the highest shifted signals therein.

As described, the scaling is performed with left shifting. It might be noted that right circular shifting can also be used by connecting the detector 70 to the right-shift sense lines 50 and beginning a shift sequence with a right shift of three, since a right circular shift of one less than the number of digital signals being shifted is equivalent to a one-place left circular shift. In all other respects the control is the same excepting that the shift count is decreased rather than increased. The foregoing description is for scaling information in the one's complement representation, but means for scaling information in other representations will be apparent to those of ordinary skill in the art, and this description is not meant to limit the invention to use with information in a particular representation.

The invention is particularly adapted for an array constructed with magnetic film cores having uniaxial anisotropy. Such cores consist of saturable ferromagnetic material and have a preferred or easy magnetization axis in the plane of the film and a difficult or hard magnetization axis in the plane of the film and perpendicular to the easy axis. The magnetization tends to be aligned with the easy axis. The hysteresis characteristic along the easy axis is that of a permanent magnet, while the characteristic along the hard axis, shown in FIGURE 3, is that of a saturable transformer core. The array windings may be magnetically coupled to the easy axis to provide operation as described above.

In an alternate embodiment, one of the array 10 magnetic elements 12 is shown schematically in FIG. 2 as a magnetic film 90 with the printed circuit windings 92 magnetically associated with its hard magnetization axis. A bias source 94 has a winding linking all array cores for magnetically biasing all such cores to point 96 on the FIG. 3 hard axis hysteresis characteristics. The signal to be shifted is supplied by the digital signal source 18' over the columnar printed winding 20'. A one signal opposes the source 94 bias filed to move the core to the point 98 of the saturation region. The shift line current pulse amplifier 22' provides a shift pulse over the line 24' to magnetically drive the core into the hard-axis high-permeability region 100 so that a portion of the pulse is transferred to the printed circuit sense lines 102 which correspond to the FIG. 1 sense lines. With a binary zero signal from source 18' the core remains at 96 so that the shift pulse merely moves it in the saturation magnetization region toward point 98 and an insubstantial portion of the pulse is transferred to lines 102. The rest of the FIG. 1 circuit remains unchanged.

The latter described element 90 operates extremely fast as a change in the hard-axis component of the magnetization occurs by the rotation of the magnetization vector. Rotational behavior is described by C. D. Olson and A. V. Pohm in "Flux Reversal in Thin Films of 82%, Ni, 18% Fe" on page 274 and by R. M. Sanders and T. D. Rossing in "Reversible Rotation in Magnetic Films" on page 288, Journal of Applied Physics, vol. 29, No. 3, March 1958.

Construction of devices using magnetic films is fully described in the pending application entitled "Methods for Making Laminated Structure," by Sidney M. Rubens et al., bearing Serial Number 13,361, filed March 7, 1960, now Patent Number 3,155,561 and assigned to the assignee of this application.

As used herein and in the appended claims the term "rectangular array" with "columns, rows and diagonals" is intended to include any array of two-state elements, such as ferromagnetic cores with rectangular hysteresis characteristics, which may be rearranged to form the FIG. 1 illustrated array with no limitation as to the number of digit positions being intended.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For scaling digital signals in a digital register; an array of two-state elements arranged in rows, columns and diagonals; the two states being signal-passing and signal-blocking states, a digital-signal input line being input-connected to every element in each array column, a shift line being input-connected to every element in each array row, one of the shift lines being for causing a digital signal shift of zero places, a plurality of sense lines respectively output-connected to every element in each array diagonal parallel to one of the major diagonals, a difference detector connected to two of the sense lines which are respectively output-connected to elements associated with the zero shift line and the input lines of the two left-most columns, output means connected to all of the sense lines, and effectively interconnecting same such that the resultant interconnected lines each have one output connection in each of the rows and columns, shift control means connected to the shift lines for providing a single impulse on one line to cause a shift, scale-factor control means connected to the shift control means and the difference detector for successively causing zero and a greater than zero signal shifts until the detector senses two different digital signals.

2. In a digital-signal shift and scaling circuit, an array of magnetic devices, a plurality of first windings respectively magnetically linked to every device in several predetermined column groups of such devices, a plurality of second windings respectively magnetically linked to one device in each one of said groups with every device in each group being linked to one of the second windings, two current sources each including control means and being respectively connected to the first and second windings for supplying predetermined binary current magnitudes in selected ones of the first windings and a single current impulse to only one of the second windings whereby only the devices magnetically influenced by both of said currents undergo a substantial magnetization change, a plurality of sense windings each of which is magnetically linked to one device in each of the column groups and to each of the second windings, and a difference detector connected to two of the sense windings which are arbitrarily defined as scale-factor-indicating windings, said detector being operative to indicate maximum scale when the respective two sense windings have different momentary magnetization-change-indicating signals as caused by an impulse on a predetermined one of the second windings.

3. A scale and shift circuit comprising a rectangular array of two electrical state elements arranged in rows, columns and diagonals; first energizing means connected to every element in the respective columns; second energizing means connected to every element in the respective rows; the elements being responsive to the first means to assume a first one of the two electrical states and being responsive to the second means irrespective of the first means to assume, at least partially and momentarily, a second one of the two electrical states, sensing means connected to the elements along each of the respective diagonals and being responsive to a change in the elements from the first to the second states, a difference detector connected to a selected two of the sensing means and being responsive to signals therein which respectively indicate difference element states to provide an output signal, and control means for activating the second means to successively energize the various element rows and being responsive to the output signal to terminate said successive energizations.

References Cited by the Examiner

UNITED STATES PATENTS

| | | | |
|---|---|---|---|
| 3,015,443 | 1/62 | Miller | 340—174 |
| 3,076,181 | 1/63 | Newhouse et al. | 340—174 |
| 3,139,531 | 6/64 | Franck et al. | 340—174 |

FOREIGN PATENTS

| | | |
|---|---|---|
| 1,101,201 | 10/55 | France. |

IRVING L. SRAGOW, *Primary Examiner.*

UNITED STATES PATENT OFFICE

CERTIFICATE OF CORRECTION

Patent No. 3,193,808 July 6, 1965

Richard M. Sanders

It is hereby certified that error appears in the above numbered patent requiring correction and that the said Letters Patent should read as corrected below.

Column 3, line 3, for "has" read -- as --; line 28, strike out "44,", second occurrence; line 44, after "below" insert -- to --; column 5, line 64, for "filed" read -- field --; column 6, line 12, for "Structure" read -- Structures --; column 7, line 15, for "difference" read -- different --.

Signed and sealed this 28th day of December 1965.

(SEAL)
Attest:

ERNEST W. SWIDER
Attesting Officer

EDWARD J. BRENNER
Commissioner of Patents